United States Patent [19]

Gonzalez

[11] Patent Number: 5,330,856
[45] Date of Patent: Jul. 19, 1994

[54] METHOD OF MAKING A CATHODE FOR USE IN AN ELECTROLYTIC CELL

[75] Inventor: Jose Gonzalez, Sunnyvale, Calif.

[73] Assignee: Valence Technology, Inc., San Jose, Calif.

[21] Appl. No.: 73,195

[22] Filed: Jun. 8, 1993

[51] Int. Cl.$^5$ .......................... H01M 6/18; H01M 6/00
[52] U.S. Cl. .................................... 429/212; 429/192; 29/623.5
[58] Field of Search ............... 429/192, 194, 191, 245, 429/212; 29/623.1, 623.5; 427/115

[56] References Cited

U.S. PATENT DOCUMENTS

| | | | |
|---|---|---|---|
| 4,830,939 | 5/1989 | Lee et al. | 429/192 X |
| 4,990,413 | 2/1991 | Lee et al. | 429/192 X |

Primary Examiner—Anthony Skapars
Attorney, Agent, or Firm—Russell LaPaglia

[57] ABSTRACT

A method for making a cathode comprises introduction of polyethylene oxide into a suitable solvent prior to introduction of a compatible cathodic material and an electroconductive agent. The mixture of components forms a cathode paste which is used to form a cathode which can be employed in an electrolytic cell, e.g., a solid battery.

14 Claims, No Drawings

METHOD OF MAKING A CATHODE FOR USE IN AN ELECTROLYTIC CELL

BACKGROUND OF THE INVENTION

1. Field of the Invention

The present invention relates to a cathode having improved conductivity and hardness and a method for making the cathode.

This invention is further directed to electrolytic cells, e.g., solid batteries, containing the cathode.

2. State of the Art

Electrolytic cells containing an anode, a cathode, and a solid solvent-containing electrolyte are known in the art and are usually referred to as "solid batteries". These cells offer a number of advantages over electrolytic cells containing a liquid electrolyte (i.e., "liquid batteries") including improved safety features.

The cathode employed in such a cell is typically comprised of a compatible cathodic material (i.e., insertion compounds) which is any material which functions as a positive pole in a solid electrolytic cell. Such compatible cathodic materials are well known in the art and include, by way of example, manganese dioxide, molybdenum trioxide, oxides of vanadium such as $V_6O_{13}$, $V_2O_5$, $LiV_3O_8$, and the like, sulfides of titanium and niobium, chromium oxide, copper oxide, and the like.

In preparing a cathode, the compatible cathodic material can for example, be mixed with an electroconductive material including, by way of example, graphite powdered carbon, powdered nickel, metal particles, conductive polymers (i.e., characterized by a conjugated network of double bonds like polypyrol and polyacetylene), and the like, and a binder such as poly(tetrafluoroethylene) to form under pressure a cathodic plate.

It has also been recognized that the cathode can be prepared from a cathode paste which comprises from about 35 to about 65 weight percent of a compatible cathodic material; from about 1 to 20 weight percent of an electroconductive material; up to about 20 weight percent of polyethylene oxide having a number average molecular weight of at least 100,000; from about 10 to 50 weight percent of a suitable solvent; and from at least about 5 weight percent to about 30 weight percent of a solid matrix forming monomer or partial polymer thereof. (All weight percents are based on the total weight of the cathode).

In the production of the paste, the components are typically simultaneously mixed together. Moreover, in such an arrangement, the polyethylene oxide is typically introduced into the other solids in the system, e.g., the compatible cathodic material and the electroconductive material.

The cathode paste is spread onto a suitable support such as current collector and cured by conventional methods to provide for a solid positive cathodic plate. The cathode (excluding the support) generally has a thickness of about 20 to about 150 microns.

Current collectors are well recognized in the art and some of which are commercially available. A typical current collector for the cathode is a roughened nickel (electrolytically deposited nickel) on nickel current collector (available as CF18/NiT from Fukuda Metal Foil & Powder Company, Ltd., Kyoto, Japan). The current collectors are typically attached to the surface of the cathode not facing the electrode but can also be attached to the anode. When the current collector is attached to the cathode, the cathode is interposed between the electrolyte and the current collector.

SUMMARY OF THE INVENTION

The present invention is based in part on the surprising discovery that the method of manufacture can greatly influence the conductivity and hardness of a resulting cathode.

In particular, the present invention relates to a method for the production of a cathode in which the polyethylene oxide is uniformly premixed with substantially all of the liquids, e.g., solvent, prior to introduction of a compatible cathodic material and an electroconductive material.

In one preferred embodiment, the polyethylene oxide is mixed with a cathode premix comprising the solvent and an effective amount of solid matrix forming monomer and/or partial polymer thereof. Effective amounts of the compatible cathodic material an electroconductive agent are then mixed, so as to form a cathodic paste. This paste can then be introduced onto a support and cured.

In other aspects, the present invention relates to a cathode made by the inventive method and an electrolytic cell which employs the cathode.

DETAILED DESCRIPTION OF THE PREFERRED EMBODIMENTS

As discussed above, the present invention relates to a cathode, which, by virtue of its method of manufacture, has an improved conductivity and hardness. In another aspect, the present invention relates to the use of the cathode in an electrolytic cell containing a solid electrolyte.

However, prior to describing the preferred embodiment of the invention in further detail, the following terms will be defined.

Definitions

As used herein, the following terms have the following meanings.

The term "electrolytic cell" refers to a composite containing an anode, a cathode and a solid ion-conducting electrolyte interposed therebetween.

The anode is typically comprised of a compatible anodic material which is any material which functions as an anode in a solid electrolytic cell. Such compatible anodic materials are well known in the art and include, by way of example, lithium, lithium alloys, such as alloys of lithium with aluminum, mercury, nickel, zinc, and the like, and intercalation based anodes such as carbon, $WO_3$, and the like.

The solid electrolyte which is interposed between a cathode and an anode contains either an inorganic or an organic matrix as well as a suitable inorganic ion salt. The inorganic matrix may be non-polymeric [e.g., $\beta$-alumina, silver oxide, lithium iodide, etc.] or polymeric [e.g., inorganic (polyphosphazine) polymers] whereas the organic matrix is typically polymeric. Suitable organic polymeric matrices are well known in the art and are typically organic polymers obtained by polymerization of a suitable organic monomer as described, for example, in U.S. Pat. No. 4,908,283. Suitable organic monomers include, by way of example, polyethylene oxide, polypropylene oxide, polyethyleneimine, polyepichlorohydrin, polyethylene succinate, and an acryloyl-derivatized polyalkylene oxide containing an acryloyl group of the formula $CH_2=CR'C(O)O-$ where R' is hydrogen or lower alkyl of from 1–6 carbon atoms.

The solid electrolytes also contain a solvent (plasticizer) which is typically added to the matrix in order to enhance the solubility of the inorganic ion salt in the solid electrolyte and thereby increase the conductivity of the electrolytic cell. In this regard, the solvent requirements of the solvent used in the solid electrolyte are art recognized to be different from the solvent requirements in liquid electrolytes. For example, solid electrolytes require a lower solvent volatility as compared to the solvent volatilities permitted in liquid electrolytes.

Suitable solvents well known in the art for use in such solid electrolytes include, by way of example, propylene carbonate, ethylene carbonate, $\gamma$-butyrolactone, tetrahydrofuran, glyme, (dimethoxyethane), diglyme, tetraglyme, dimethyl-sulfoxide, dioxolane, sulfolane and the like. Other suitable solvents include a mixture of a organic carbonate, e.g., propylene carbonate, and triglyme as is disclosed in copending application, Ser. No. 07/918,509, now U.S. Pat. No. 5,289,143 which is incorporated herein by reference in its entirety.

In one embodiment, the electrolyte solvent and the cathode solvent are identical.

The solid, solvent-containing electrolyte is typically formed in one of two methods. In one method, the solid matrix is first formed and then a requisite amount of this material is dissolved in a volatile solvent. Requisite amounts of the inorganic ion salt and the electrolyte solvent are then added to the solution. This solution is then placed on the surface of a suitable substrate (e.g., the surface of a cathode) and the volatile solvent, is removed to provide for the solid electrolyte.

In the other method, a monomer or partial polymer of the polymeric matrix to be formed is combined with appropriate amounts of the inorganic ion salt and the solvent. This mixture is then placed on the surface of a suitable substrate (e.g., the surface of the cathode) and the monomer is polymerized or cured (or the partial polymer is then further polymerized or cured) by conventional techniques (heat, ultraviolet radiation, electron beams, etc.) so as to form the solid, solvent-containing electrolyte.

When the solid electrolyte is formed on a cathodic surface, an anodic material can then be attached, e.g., laminated, onto the solid electrolyte to form a solid battery (i.e., an electrolytic cell).

The term "solid polymeric matrix" refers to an electrolyte compatible material formed by polymerizing an inorganic or organic monomer (or partial polymers thereof) and which, when used in combination with the other components of the electrolyte, renders the electrolyte solid. The solid matrix may or may not be ion-conducting. Preferably, however, the solid matrix is capable of ionically conducting inorganic cations (e.g., alkali ions).

Suitable solid polymeric matrices are well known in the art and include solid matrices formed from inorganic polymers, organic polymers or a mixture of polymers with inorganic non-polymeric materials.

Preferably, the solid polymeric matrix is an organic matrix derived from a solid matrix forming monomer and/or from partial polymers of a solid matrix forming monomer.

Alternately, the solid polymeric matrix can be used in combination with the non-polymeric inorganic matrix. See, for example U.S. Pat. No. 4,990,413 which is incorporated herein by reference in its entirety. Suitable non-polymeric inorganic materials for use in conjunction with the solid polymeric matrix include, by way of example, $\beta$-alumina, silver oxide, lithium oxide, and the like. Suitable inorganic monomers are also disclosed in U.S. Pat. Nos. 4,247,499; 4,388,385; 4,414,607; 4,394,280; 4,432,891, 4,539,276; and 4,557,985 each of which is incorporated herein by reference.

The term "a solid matrix forming monomer" refers to inorganic or organic materials which in monomer form can be polymerized, preferably in the presence of an alkali metal salt and a solvent to form solid matrices which are suitable for use as solid electrolytes in electrolytic cells. Suitable solid matrix forming monomers are well known in the art and the particular monomer employed is not critical. Preferably, the solid matrix forming monomers have at least one hetero atom capable of forming donor acceptor bonds with inorganic cations (e.g., alkali ions). When polymerized, these compounds form an ionically conductive matrix.

Examples of suitable organic solid matrix forming monomers include, by way of example, propylene oxide, ethyleneimine, ethylene oxide, epichlorohydrin, acryloyl-derivatized polyalkylene oxide (as disclosed in U.S. Pat. No. 4,908,283), vinyl sulfonate polyalkylene oxides (as disclosed in U.S. patent application Ser. No. 07/918,438; now U.S. Pat. No. 5,262,253 and entitled "SOLID ELECTROLYTES DERIVED BY POLYMERIZATION OF VINYL SULFONATE POLYALKYLENE OXIDES" which application is incorporated herein by reference in its entirety), and the like as well as mixtures thereof.

Examples of suitable inorganic solid matrix forming monomers include, by way of example, phosphazines and siloxanes. Phosphazine monomers and the resulting phosphazine solid matrix are disclosed by Abraham et al., Proc. Int. Power Sources Symp., 34th, pp. 81–83 (1990) and by Abraham et al., J. Electrochemical Society, Vol. 138, No. 4, pp. 921–927 (1991).

The term "a partial polymer of a solid matrix forming monomer" refers to solid matrix forming monomers which have been partially polymerized to form reactive oligomers. Partial polymerization may be conducted for the purpose of enhancing the viscosity of the monomer, decreasing the volatility of the monomer, and the like. Partial polymerization is generally permitted so long as the resulting partial polymer can be further polymerized, preferably in the presence of an inorganic ion salt and a solvent, to form solid polymeric matrices which are suitable for use as solid electrolytes in electrolytic cells.

The term "cured" or "cured product" refers to the treatment of the solid matrix forming monomer or partial polymer thereof under polymerization conditions (including cross-linking) so as to form a solid polymeric matrix. Suitable polymerization conditions are well known in the art and include by way of example, heating the monomer, irradiating the monomer with UV light, electron beams, etc. The resulting cured product preferably contains repeating units containing at least one hetero atom such as oxygen or nitrogen which is capable of forming donor acceptor bonds with inorganic cations (alkali ions). Examples of suitable cured products suitable for use in this invention are set forth in U.S. Pat. Nos. 4,830,939 and 4,990,413 which are incorporated herein by reference in their entirety.

The solid matrix forming monomer or partial polymer can be cured or further cured prior to or after addition of the inorganic ion salt and the solvent. For example, a composition comprising requisite amounts of the solid matrix forming monomer, inorganic salt and solvent can be applied to a substrate and then cured. Alternatively, the solid matrix forming monomer can be first cured and then dissolved into a suitable volatile solvent. Requisite amounts of the inorganic ion salt and solvent can then be added. The mixture is then placed on a substrate and removal of the volatile solvent results in formation of a solid electrolyte. In either case, the resulting solid electrolyte is a homogeneous, single phase product which is maintained upon curing, and does not readily separate upon cooling to temperatures below room temperature. Accordingly, the solid electrolyte of this invention does not include a separator as is typical of liquid electrolytes.

The term "inorganic ion salt" refers to any inorganic salt which is suitable for use in a solid electrolyte. The particular inorganic ion salt employed is not critical and examples of suitable inorganic ion salts include, by way of example, $LiClO_4$, $LiI$, $LiSCN$, $LiBF_4$, $LiAsF_6$, $LiCF_3SO_3$, $LiPF_6$, $NaI$, $NaSCN$, $KI$, $CsSCN$, $AgNO_3$, $CuCl_2$, $Mg(ClO_4)_2$ and the like. The inorganic ion salt preferably contains at least one atom selected from the group consisting of Li, Na, K, Cs, Ag, Cu and Mg.

The solid, solvent-containing electrolyte can be prepared by combining a solid matrix forming monomer with an inorganic ion salt and a solvent. The resulting composition can then be uniformly coated onto a suitable substrate (e.g., aluminum foil, a glass plate, a lithium anode, a cathode, etc.) by means of a roller, a doctor blade, a bar coater, a silk screen or spinner to obtain a film of this composition or its solution. In some cases, it may be necessary to heat the composition so as to provide for a coatable material.

Preferably, the amount of material coated onto the substrate is an amount sufficient such that, after curing, the resulting solid, solvent-containing electrolyte has the desired thickness.

The electrolyte composition typically comprises from about 5 to about 25 weight percent of an alkali metal salt based on the total weight of the electrolyte; preferably, from about 10 to about 20 weight percent; and even more preferably about 15 weight percent.

The electrolyte composition typically comprises from about 40 to about 80 weight percent solvent based on the total weight of the electrolyte; preferably from about 60 to 80 weight percent; and even more preferably about 70 weight percent.

The solid electrolyte composition typically comprises from about 5 to about 30 weight percent of the solid polymeric matrix based on the total weight of the electrolyte; preferably from about 10 to about 20 weight percent; and even more preferably about 17 weight percent.

In another embodiment, the electrolyte composition further comprises a small amount of a film forming agent. Suitable film forming agents are well known in the art and include, by way of example, polyethylene oxide, polypropylene oxide, copolymers thereof, and the like, having a numbered average molecular weight of at least about 100,000. Preferably, the film forming agent is employed in an amount of about 10 weight percent and more preferably at about 2.5 weight percent based on the total weight of the electrolyte composition.

The composition is cured by conventional methods to form a solid film. For example, when the solid matrix forming monomer contains a reactive double bond, suitable curing methods include heating, irradiation with UV radiation, irradiation with electron beams (EB), etc. When the composition is cured by heating or UV radiation, the composition preferably contains an initiator. For example, when curing is by heating, the initiator is typically a peroxide such as benzoyl peroxide, methyl ethyl ketone peroxide, t-butyl peroxypyvarate, diisopropyl peroxycarbonate, and the like). When curing is by UV radiation, the initiator is typically benzophenone Darocur 1173 (Ciba Geigy, Ardlesy, N.Y.), and the like.

The initiator is generally employed in an amount sufficient to catalyze the polymerization reaction. Preferably, the initiator is employed at up to 1 weight percent based on the weight of the solid matrix forming monomer.

When curing is by electron beam treatment, an initiator is not required.

Irrespective of the method of making, the resulting electrolyte is a homogenous, single phase material which is maintained upon curing, and does not readily separate upon cooling to temperatures below room temperature. See, for example, U.S. Pat. No. 4,925,751 which is incorporated herein by reference in its entirety.

The Cathode-Methodology and Utility

As discussed above, a cathode according to the present invention is based upon the surprising discovery that the mixing of polyethylene oxide with the solvent prior to introduction of a compatible cathodic material and an electroconductive material, is capable of providing a cathode having improved properties.

In this regard, although the components and their amounts are the same as that previously employed in producing cathodes, the method in which they are combined differs.

For example, the method comprises the uniform mixing of polyethylene oxide (PEO) into substantially all, if not all, of the solvent, prior to introduction of a compatible cathodic material and an electroconductive material.

In one preferred embodiment, the method comprises providing a cathode premix comprising the solvent and suitable prepolymeric materials, e.g., a solid matrix forming monomer or partial polymer thereof. The polyethylene oxide is uniformly combined into the premix. That is, a substantially uniform mixture of the components is provided. In this regard, the mixing means employed is not critical to the present invention.

For example, the PEO can be introduced gradually into the premix and mixed by suitable means until the polyethylene oxide is complete dissolved therein.

In one preferred embodiment, the PEO is introduced into the solvent by way of a mini-sieve such as a 25 mesh mini-sieve commercially available as order No. 57333-965 from BWR Scientific, San Francisco, Calif.

The cathode powder and additional electroconductive material, e.g., powdered carbon, can then be introduced into this admixture. These components can be added separately in any order or can be premixed together. Once again, the mixture is not critical to the present invention.

The cathode paste is then mixed under conditions, e.g., a suitable temperature and a suitable period of time to provide a uniform product.

The process of the present invention is preferably formed at elevated temperatures. For example, during introduction of the PEO, the mixture should be at a temperature which is sufficient to allow the PEO to be dissolved into the liquid components, typically above about 55° C. Moreover, it is preferred that final mixing occur at a temperature not greater than about 85° C. The final paste can then be cooled prior to any subsequent use.

The cathode paste according to the present invention is employed in the same manner as that paste produced by more traditional techniques. For example, the paste can be spread onto a suitable support and cured so as to provide a solid positive cathodic plate.

The cathode paste according to the present invention is capable of providing having a cathode having a lower resistivity and an improved, i.e., higher, hardness when compared with cathodes produced previously.

One preferred use of the cathode involves a process of forming an electrolytic cell which comprises the steps of coating the surface of a cathode with a composition comprising a solid matrix forming monomer, an inorganic ion salt and solvent. The composition is then cured to provide for a solid electrolyte on the cathodic surface. An anode (e.g., a lithium foil) is then laminated to this composite product in such a way that the solid electrolyte is interposed between the lithium foil and the cathodic material.

This process can be reversed so that the surface of the anode is coated with a composition comprising a solid matrix forming monomer, an inorganic ion salt and the electrolyte solvent. The composition is then cured to provide for a solid electrolyte on the anodic surface. The cathode is then laminated to this composite product in such a way that the solid electrolyte is interposed between the lithium foil and the cathodic material.

Methods for preparing solid electrolytes and electrolytic cells are also set forth in U.S. Pat. Nos. 4,830,939 and 4,925,751 which are incorporated herein by reference in their entirety.

Furthermore, it is desirable to avoid the use of any protic materials which will be incorporated into the cell. For example, most of the protic inhibitors employed in producing the cell are preferably removed prior to formation of the cathode and/or electrode. In this regard, removal of these inhibitors down to a level of less than 50 parts per million (ppm) can be accomplished by contacting these monomers and prepolymers with an inhibitor remover. Suitable inhibitor removers are commercially available.

The following examples are offered to illustrate the present invention and should not be construed in any way as limiting its scope.

EXAMPLES

Example 1

A cathode according to the present invention was prepared by introducing 5280 g of a cathode premix into a double planetary mixture (Ross No. 2 mixer available from Charles Ross and Sons, Co., Hauppag, N.Y.) which was held at a constant temperature by circulation of a constant temperature baths set at 115° C.

This cathode premix comprises the following:
61.81 wt % propylene carbonate
15.45 wt % triglyme
19.33 wt % polyethylene glycol diacrylate (PEGDA)
3.11 wt % ethoxylated trimethylolpropane triacrylate (TMPEOTA).

In this regard, the PEGDA has a molecular weight of about 400 and is available as SR-344 from Sartomer Company, Inc., Exton, Pa. and the TMPEOTA has a molecular weight of about 450 and is available as SR-454 from Sartomer Company, Inc., Exton, Pa.

About 120 grams of polyethylene oxide (number average molecular weight about 600,000 available as Polyox WSR-205 from Union Carbide Chemicals and Plastics, Danbury, Conn.) was introduced into the mixer over a 5 minute period while maintaining a speed of about 300 rpm. This admixture was then mixed for about 30 minutes to allow the PEO to dissolve completely into the mixture.

A cathode powder was prepared by combining 90.44 weight percent $V_6O_{13}$ (prepared by heating ammonium metavanadate ($NH_4^+VO_3$) at 450° C. for 16 hours under $N_2$ flow and 9.56 weight percent of carbon (from Chevron Chemical Company, San Ramon, Calif.) under the tradename of Shawinigan Black TM. About 100 grams of the resulting mixture was placed into a grinding machine (Attritor Model S-1 purchased from Union Process, Akron, Ohio) and ground for 30 minutes. Afterwards, the resulting mixture was dried at about 260° C. for 16 hours to provide a cathode powder having about 84.45 weight percent $V_6O_{13}$.

About 5971 grams of the cathode powder and about 629 grams of unground carbon (from Chevron Chemical Company, San Ramon, Calif. under the tradename of Shawinigan Black TM) was introduced into the mixture.

The paste was mixed at about 7.5 hz for about 30 minutes at a temperature of about 85° C.

The heat circulation was stopped while the mixture was allowed to cool to less than 40° C., mixing was maintained during this period at about 1 hz.

The resulting cathode was tested for resistivity and hardness over a 6½ hour period and the results are as follows:

The hardness was about 390–400 g with the cathode resistivity $R_\alpha$ increasing from 42.29 to 56.67 ohm·cm over the testing period.

Comparative Example 2

629 grams of unground carbon (Shawinigan Black TM), 5971 grams of cathode powder (such as that employed in Example 1) and 120 grams of PEO were introduced into a double planetary mixer and mixed at 5.5 Hz at temperature of less than 40° C. for 15 minutes.

5280 grams of a cathode premix such as that of Example 1 was introduced into the mixture and mixed at 15 Hz at a temperature of 85° C. for about 1.5 hours.

The heat circulation was stopped while the mixture was allowed to cool to less than 40° C. while mixing was maintained at about 1 Hz.

A cathode produced from this paste was also tested for hardness and resistivity over a 48 hour period, with the hardness being about 290-320 g and the resistivity, $R_\alpha$, increasing from 169.72 to 244.62 ohms·cm.

As can be seen by a comparison of Example 1 and Comparative Example 2, the cathode according to the present invention has a vastly improved hardness and resistivity when compared to cathodes produced in the comparative example.

Example 3

A solid electrolytic cell is prepared by first preparing a cathodic paste which is spread onto a current collector and is then cured to provide for the cathode. An electrolyte solution is then placed onto the cathode surface and is cured to provide for the solid electrolyte composition. Then, the anode is laminated onto the solid electrolyte composition to provide for a solid electrolytic cell. The specifics of this construction are as follows:

A. The Current Collector

The current collector employed is a sheet of aluminum foil having a layer of adhesion promoter attached to the surface of the foil which will contact the cathode so as to form a composite having a sheet of aluminum foil, a cathode and a layer of adhesion promoter interposed therebetween.

Specifically, the adhesion promoter layer is prepared as a dispersed colloidal solution in one of two methods. The first preparation of this colloidal solution for this example is as follows:

84.4 weight percent of carbon powder (Shawinigan Black TM —available from Chevron Chemical Company, San Ramon, Calif.)

337.6 weight percent of a 25 weight percent solution of polyacrylic acid (a reported average molecular weight of about 90,000, commercially available from Aldrich Chemical Company—contains about 84.4 grams polyacrylic acid and 253.2 grams water)

578.0 weight percent of isopropanol

The carbon powder and isopropanol are combined with mixing in a conventional high shear colloid mill mixer (Ebenbach-type colloid mill) until the carbon is uniformly dispersed and the carbon particle size is smaller than 10 microns. At this point, the 25 weight percent solution of polyacrylic acid is added to the solution and mixed for approximately 15 minutes. The resulting mixture is pumped to the coating head and roll coated with a Meyer rod onto a sheet of aluminum foil (about 9 inches wide and about 0.0005 inches thick). After application, the solution/foil are contacted with a Mylar wipe (about 0.002 inches thick by about 2 inches and by about 9 inches wide—the entire width of aluminum foil). The wipe is flexibly engaged with the foil (i.e., the wipe merely contacted the foil) to redistribute the solution so as to provide for a substantially uniform coating. Evaporation of the solvents (i.e., water and isopropanol) via a conventional gas-fired oven provides for an electrically-conducting adhesion-promoter layer of about 6 microns in thickness or about $3 \times 10^{-4}$ grams per cm$^2$. The aluminum foil is then cut to about 8 inches wide by removing approximately ½ inch from either side by the use of a conventional slitter so as to remove any uneven edges.

In order to further remove the protic solvent from this layer, the foil is redried. In particular, the foil is wound up and a copper support placed through the roll's cavity. The roll is then hung overnight from the support in a vacuum oven maintained at about 130° C. Afterwards, the roll is removed. In order to avoid absorption of moisture from the atmosphere, the roll is preferably stored into a desiccator or other similar anhydrous environment to minimize atmospheric moisture content until the cathode paste is ready for application onto this roll.

The second preparation of this colloidal solution comprises mixing 25 lbs of carbon powder (Shawinigan Black TM —available from Chevron Chemical Company, San Ramon, Calif.) with 100 lbs of a 25 weight percent solution of polyacrylic acid (average molecular weight of about 240,000, commercially available from BF Goodrich, Cleveland, Ohio, as Good-Rite K702—contains about 25 lbs polyacrylic acid and 75 lbs water) and with 18.5 lbs of isopropanol. Stirring is done in a 30 gallon polyethylene drum with a gear-motor mixer (e.g., Lightin Labmaster Mixer, model XJ-43, available from Cole-Parmer Instruments Co., Niles, Ill.) at 720 rpm with two 5 inch diameter A310-type propellers mounted on a single shaft. This wets down the carbon and eliminates any further dust problem. The resulting weight of the mixture is 143.5 lbs and contains some "lumps".

The mixture is then further mixed with an ink mill which consists of three steel rollers almost in contact with each other, turning at 275, 300, and 325 rpms respectively. This high shear operation allows particles that are sufficiently small to pass directly through the rollers. Those that do not pass through the rollers continue to mix in the ink mill until they are small enough to pass through these rollers. When the mixing is complete, the carbon powder is completely dispersed. A Hegman fineness of grind gauge (available from Paul N. Gardner Co., Pompano Beach, Fla.) indicates that the particles are 4–6 $\mu$m with the occasional 12.5 $\mu$m particles. The mixture can be stored for well over 1 month without the carbon settling out or reagglomerating.

When this composition is to be used to coat the current collector, an additional 55.5 lbs of isopropanol is mixed into the composition working with 5 gallon batches in a plastic pail using an air powered shaft mixer (Dayton model 42231 available from Granger Supply Co., San Jose, Calif.) with a 4 inch diameter Jiffy-Mixer brand impeller (such as an impeller available as Catalog No. G-04541-20 from Cole Parmer Instrument Co., Niles, Ill.). Then, it is gear pumped through a 25 $\mu$m cloth filter (e.g., So-Clean Filter Systems, American Felt and Filter Company, Newburgh, N.Y.) and Meyer-rod coated as described above.

B. The Cathode

The cathode is prepared from a cathodic paste which, in turn, is prepared from a cathode powder as follows:

i. Cathode Powder

The cathode powder is prepared by combining 90.44 weight percent $V_6O_{13}$ [prepared by heating ammonium metavanadate ($NH_4^+VO_3^-$) at 450° C. for 16 hours under $N_2$ flow] and 9.56 weight percent of carbon (from Chevron Chemical Company, San Ramon, Calif. under the tradename of Shawinigan Black TM). About 100 grams of the resulting mixture is placed into a grinding machine (Attritor Model S-1 purchased from Union Process, Akron, Ohio) and ground for 30 minutes. Afterwards, the resulting mixture is dried at about 260° C. for 21 hours.

ii. Cathode Paste

A cathode paste is prepared by combining sufficient cathode powder to provide for a final product having 45 weight percent $V_6O_{13}$.

Specifically, 171.6 grams of a 4:1 weight ratio of propylene carbonate:triglyme is combined with 42.9 grams of polyethylene glycol diacrylate (molecular weight about 400 available as SR-344 from Sartomer Company, Inc., Exton, Pa.), and about 7.6 grams of ethoxylated trimethylolpropane triacylate (TMPEOTA) (molecular weight about 450 available as SR-454 from Sartomer Company, Inc., Exton, Pa.) in a double planetary mixer (Ross #2 mixer available from Charles Ross & Sons, Company, Hauppag, N.Y.).

A propeller mixture is inserted into the double planetary mixer and the resulting mixture is stirred at a 150 rpms until homogeneous. The resulting solution is then passed through sodiated 4A molecular sieves. The solution is then returned to double planetary mixer equipped with the propeller mixer and about 5 grams of polyethylene oxide (number average molecular weight about 600,000 available as Polyox WSR-205 from Union Carbide Chemicals and Plastics, Danbury, Conn.) is added to the solution vortex from by the propeller by a mini-sieve such as a 25 mesh mini-sieve commercially available as Order No. 57333-965 from VWR Scientific, San Francisco, Calif.

The solution is then heated while stirring until the temperature of the solution reaches 65° C. At this point, stirring is continued until the solution is completely clear. The propeller blade is removed and the carbon powder prepared as above is then is added as well as an additional 28.71 grams of unground carbon (from Chevron Chemical Company, San Ramon, Calif. under the tradename of Shawinigan Black TM). The resulting mixture is mixed at a rate of 7.5 cycles per second for 30 minutes in the double planetary mixer. During this mixing the temperature is slowly increased to a maximum of 73° C. At this point, the mixing is reduced to 1 cycle per second the mixture slowly cooled to 40° C. to 48° C. (e.g. about 45° C.). The resulting cathode paste is maintained at this temperature until just prior to application onto the current collector.

The resulting cathode paste has the following approximate weight percent of components:

| | |
|---|---|
| $V_6O_{13}$ | 45 weight percent |
| Carbon | 10 weight percent |
| 4:1 propylene carbonate/triglyme | 34 weight percent |
| polyethylene oxide | 1 weight percent |
| polyethylene glycol diacrylate | 8.5 weight percent |
| ethoxylated trimethylolpropane triacrylate | 1.5 weight percent |

In order to enhance the coatability of the carbon paste onto the current collector, it may be desirable to heat the paste to a temperature of from about 60° C. to about 130° C. and more preferably, from about 80° C. to about 90° C. and for a period of time of from about 0.1 to about 2 hours, more preferably, from about 0.1 to 1 hour and even more preferably from about 0.2 to 1 hour. A particularly preferred combination is to heat the paste at from about 80° C. to about 90° C. for about 0.33 to about 0.5 hours.

During this heating step, there is no need to stir or mix the paste although such stirring or mixing may be conducted during this step. However, the only requirement is that the composition be heated during this period. In this regard, the composition to be heated has a volume to surface area ratio such that the entire mass is heated during the heating step.

A further description of this heating step is set forth in U.S. patent application Ser. No. 07/968,203 filed Oct. 29, 1992 and entitled "METHODS FOR ENHANCING THE COATABILITY OF CARBON PASTES TO SUBSTRATES", which application is incorporated herein by reference in its entirety.

The so-prepared cathode paste is then placed onto the adhesion layer of the current collector described above by extrusion at a temperature of from about 45° to about 48° C. A Mylar cover sheet is then placed over the paste and the paste is spread to thickness of about 90 microns ($\mu$m) with a conventional plate and roller system and is cured by continuously passing the sheet through an electron beam apparatus (Electro-curtain, Energy Science Inc., Woburn, Mass.) at a voltage of about 175 kV and a current of about 1.0 mA and at a rate of about 1 cm/sec. After curing, the Mylar sheet is removed to provide for a solid cathode laminated to the aluminum current collector described above.

C. Electrolyte 56.51 grams of propylene carbonate, 14.13 grams of triglyme, and 17.56 grams of urethane acrylate (Photomer 6140, available from Henkel Corp., Coating and Chemical Division, Ambler, Pa.) are combined at room temperature until homogeneous. The resulting solution is passed through a column of 4A sodiated molecular sieves to remove water and then mixed at room temperature until homogeneous.

At this point, 2.57 grams of polyethylene oxide film forming agent having a number average molecular weight of about 600,000 (available as Polyox WSR-205 from Union Carbide Chemicals and Plastics, Danbury, Conn.) is added to the solution and then dispersed while stirring with a magnetic stirrer over a period of about 120 minutes. After dispersion, the solution is heated to between 60° C. and 65° C. with stirring until the film forming agent dissolved. The solution is cooled to a temperature of between 45° and 48° C., a thermocouple is placed at the edge of the vortex created by the magnetic stirrer to monitor solution temperature, and then 9.24 grams of $LiPF_6$ is added to the solution over a 120 minute period while thoroughly mixing to ensure a substantially uniform temperature profile throughout the solution. Cooling is applied as necessary to maintain the temperature of the solution between 45° and 48° C.

In one embodiment, the polyethylene oxide film forming agent is added to the solution via a mini-sieve such as a 25 mesh mini-sieve commercially available as Order No. 57333-965 from VWR Scientific, San Francisco, Calif.

The resulting solution contains the following:

| Component | Amount | Weight Percent[a] |
|---|---|---|
| Propylene Carbonate | 56.51 g | 56.51 |
| Triglyme | 14.13 g | 14.13 |
| Urethane Acrylate | 17.56 g | 17.56 |
| $LiPF_6$ | 9.24 g | 9.24 |
| PEO Film Forming Agent | 2.57 g | 2.57 |
| Total | 100 g | 100 |

[a] = weight percent based on the total weight of the electrolyte solution (100 g)

This solution is then degassed to provide for an electrolyte solution wherein little, if any, of the $LiPF_6$ salt decomposes.

Optionally, solutions produced as above and which contains the prepolymer, the polyalkylene oxide film forming agent, the electrolyte solvent and the $LiPF_6$ salt are filtered to remove any solid particles or gels remaining in the solution. One suitable filter device is a sintered stainless steel screen having a pore size between 1 and 50 $\mu$m at 100% efficiency.

Alternatively, the electrolyte solution can be prepared in the following manner. Specifically, in this example, the mixing procedure is conducted using the following weight percent of components:

| | |
|---|---|
| Propylene Carbonate | 52.472 weight percent |
| Triglyme | 13.099 weight percent |
| Urethane Acrylate[b] | 20.379 weight percent |
| LiPF$_6$ | 10.720 weight percent |
| PEO Film Forming Agent[c] | 3.340 weight percent |

[b](Photomer 6140, available from Henkel Corp., Coating and Chemical Division, Ambler, PA)
[c]polyethylene oxide film forming agent having a number average molecular weight of about 600,000 (available as Polyox WSR-205 from Union Carbide Chemicals and Plastics, Danbury, CT)

The mixing procedure employs the following steps:

1. Check the moisture level of the urethane acrylate. If the moisture level is less than 100 ppm water, proceed to step 2. If not, then first dissolve the urethane acrylate at room temperature, <30° C., in the propylene carbonate and triglyme and dry the solution over sodiated 4A molecular sieves (Grade 514, 8–12 Mesh from Schoofs Inc., Moraga, Calif.) and then proceed to step 4.

2. Dry the propylene carbonate and triglyme over sodiated 4A molecular sieves (Grade 514, 8–12 Mesh from Schools Inc., Moraga, Calif.).

3. At room temperature, <30° C., add the urethane acrylate to the solvent prepared in step 2. Stir at 300 rpm until the resin is completely dissolved. The solution should be clear and colorless.

4. Dry and then sift the polyethylene oxide film forming agent through a 25 mesh mini-sieve commercially available as Order No. 57333-965 from VWR Scientific, San Francisco, Calif. While stirring at 300 rpm, add the dried and pre-sifted polyethylene oxide film forming agent slowing to the solution. The polyethylene oxide film forming agent should be sifted into the center of the vortex formed by the stirring means over a 30 minute period. Addition of the polyethylene oxide film forming agent should be dispersive and, during addition, the temperature should be maintained at room temperature (<30° C.).

5. After final addition of the polyethylene oxide film forming agent, stir an additional 30 minutes to ensure that the film forming agent is substantially dispersed.

6. Heat the mixture to 68° C. to 75° C. and stir until the film forming agent has melted and the solution has become transparent to light yellow in color. Optionally, in this step, the mixture is heated to 65° C. to 68° C.

7. Cool the solution produced in step 6 and when the temperature of the solution reaches 40° C., add the LiPF$_6$ salt very slowly making sure that the maximum temperature does not exceed 55° C.

8. After the final addition of the LiPF$_6$ salt, stir for an additional 30 minutes, degas, and let sit overnight and cool.

9. Filter the solution through a sintered stainless steel screen having a pore size between 1 and 50 μm at 100% efficiency.

At all times, the temperature of the solution should be monitored with a thermocouple which should be placed in the vortex formed by the mixer.

Afterwards, the electrolyte mixture is then coated by a conventional knife blade to a thickness of about 50 μm onto the surface of the cathode sheet prepared as above (on the side opposite that of the current collector) but without the Mylar covering. The electrolyte is then cured by continuously passing the sheet through an electron beam apparatus (Electrocurtain, Energy Science Inc., Woburn, Mass.) at a voltage of about 175 kV and a current of about 1.0 mA and at a conveyor speed setting of 50 which provides for a conveyor speed of about 1 cm/sec. After curing, a composite is recovered which contained a solid electrolyte laminated to a solid cathode.

D. Anode

The anode comprises a sheet of lithium foil (about 76 μm thick) which is commercially available from FMC Corporation Lithium Division, Bessemer City, N.C.

E. The Solid Electrolytic Cell

A sheet comprising a solid battery is prepared by laminating the lithium foil anode to the surface of the electrolyte in the sheet produced in step C above. Lamination is accomplished by minimal pressure.

While the invention has been described in terms of various preferred embodiments, the artisan will appreciate the various modifications, substitutions, omissions and changes that may be made without departing from the spirit thereof. Accordingly, it is intended that the invention be limited solely by the scope of the following claims including equivalents thereof.

I claim:

1. A method for making a cathode comprising:
   (a) providing a cathode premix comprising 10 to 50 weight percent of solvent and 5 to 30 weight percent of a prepolymeric material;
   (b) introducing up to 20 weight percent of polyethylene oxide into the premix to form a mixture;
   (c) introducing 35 to 65 weight percent of a compatible cathodic material and 1 to 20 weight percent electroconductive material into said mixture so as to provide a cathode paste; and
   (d) producing a cathode from said cathode paste; wherein all weight percents are based on the total weight of said cathode paste.

2. The method according to claim 1 wherein (d) comprises introducing the cathode paste onto a support and curing the paste.

3. The method according to claim 1 wherein the prepolymeric material comprises a solid matrix-forming monomer, and/or a partial polymer thereof.

4. The method according to claim 1 wherein the compatible cathodic material comprises an oxide of vanadium.

5. The method according to claim 1 wherein the electroconductive material comprises carbon.

6. The method according to claim 1 wherein the solvent comprises a mixture of organic carbonate and triglyme.

7. The method according to claim 6 wherein the organic carbonate is propylene carbonate.

8. The method according to claim 1 wherein step (c) said mixture is at a temperature between about 55° C. and about 85° C.

9. The method according to claim 2 wherein the support comprises aluminum.

10. The method according to claim 2 wherein the curing is electron beam curing.

11. A cathode produced by the process according to any one of claims 1–10.

12. An electrolytic cell comprising an anode, a cathode, and a solid ion-conducting electrolyte interposed therebetween, wherein the cathode is produced by the process according to any one of claims 1–10.

13. The electrolytic cell according to claim 12 where the anode comprises a compatible anodic material.

14. The electrolytic cell according to claim 13 wherein the compatible anodic material comprises lithium.